United States Patent [19]

Sulit

[11] Patent Number: 4,768,578
[45] Date of Patent: Sep. 6, 1988

[54] REGENERATIVE HEAT EXCHANGE SYSTEMS AND REFRACTORY BRICKS THEREFORE

[76] Inventor: Rodialo D. Sulit, 40 Wayside Avenue Unit 10, Agincourt, Ontario, Canada, M1V 1N3

[21] Appl. No.: 34,631

[22] Filed: Apr. 6, 1987

[51] Int. Cl.[4] ............................................. F28D 17/02
[52] U.S. Cl. ....................................... 165/9.1; 165/9.4
[58] Field of Search .................................. 165/9.1–9.4

[56] References Cited

U.S. PATENT DOCUMENTS

| 2,428,461 | 10/1947 | Kinney et al. | 165/9.1 |
| 2,577,170 | 12/1951 | Walters | 165/9.1 |
| 4,436,144 | 3/1984 | Hovak | 165/9.1 |

FOREIGN PATENT DOCUMENTS

| 2529372 | 1/1977 | Fed. Rep. of Germany | 165/9.1 |
| 685789 | 1/1953 | United Kingdom | 165/9.2 |
| 2122328 | 1/1984 | United Kingdom | 165/9.1 |

Primary Examiner—Albert W. Davis, Jr.
Attorney, Agent, or Firm—Richard C. Darr

[57] ABSTRACT

A prismatic tubular brick of refractory material for constructing the checkerwork structure of regenerative furnaces, the brick having mirror image top and bottom surfaces and a central passage extending therebetween. Two pairs of opposed parallel side walls of uniform thickness having aligned recesses in the top and bottom surfaces thereof, are connected together by angle portions at their adjacent corner edges. The top and bottom surfaces of the angle portions are elevated with respect to the recessed top and bottom surfaces of the side walls and are of similar size and shape. Accordingly, the elevated and recessed surfaces of one brick cooperate with the elevated and recessed surfaces of another brick to interlock the bricks together in an offset stacked arrangement.

17 Claims, 3 Drawing Sheets

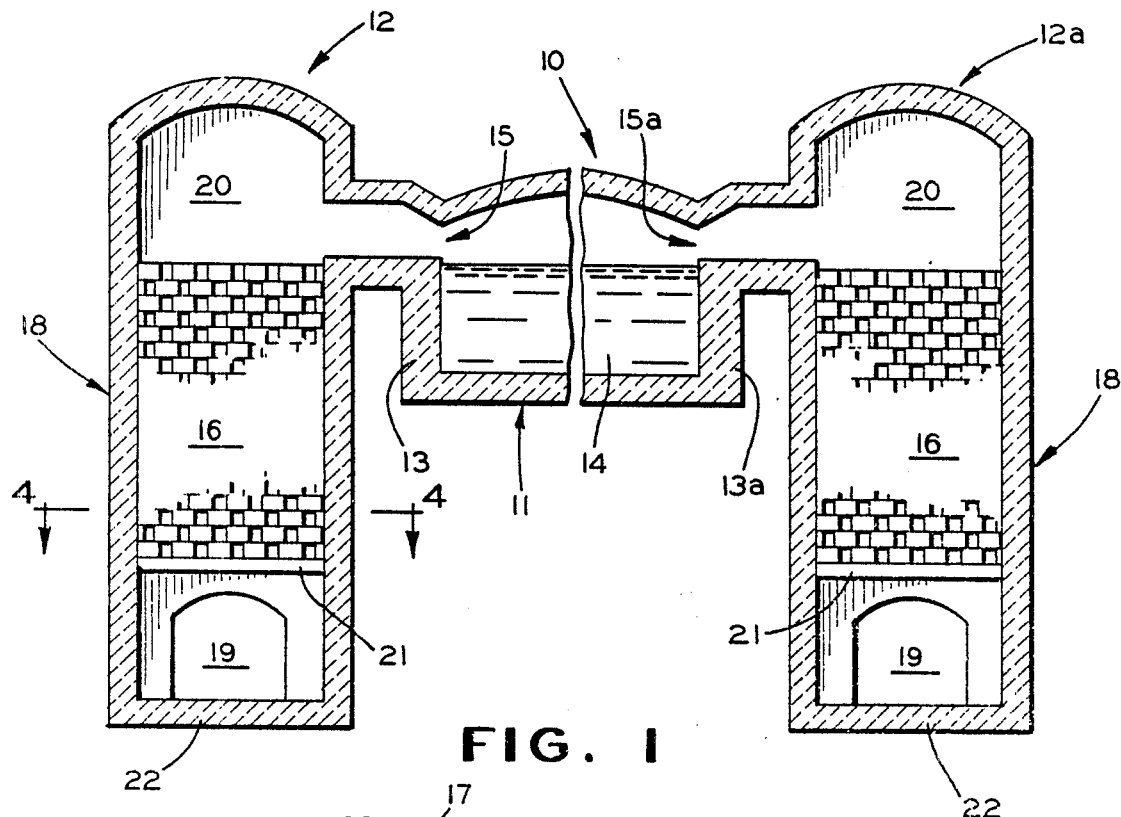
FIG. 1
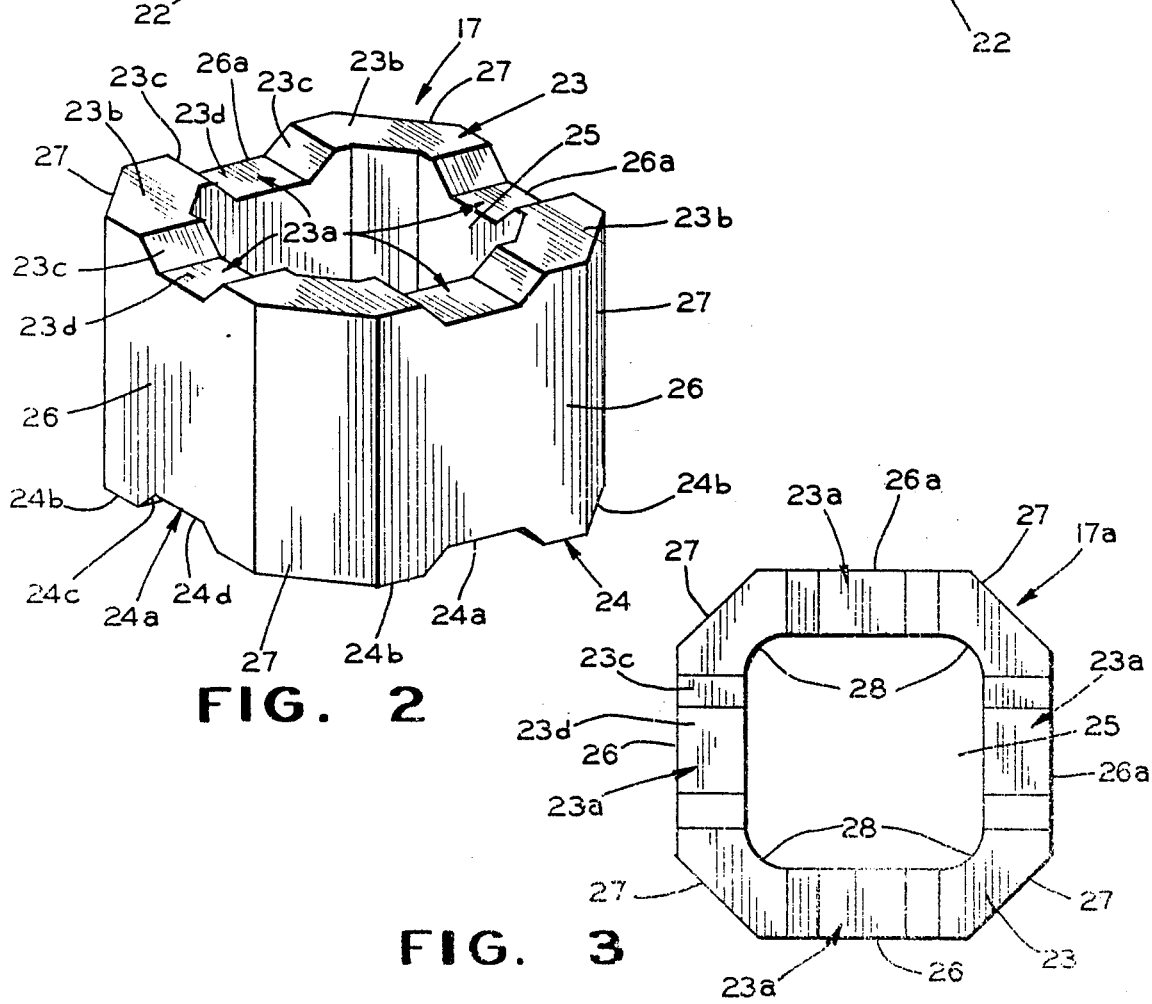
FIG. 2
FIG. 3

REGENERATIVE HEAT EXCHANGE SYSTEMS AND REFRACTORY BRICKS THEREFORE

BACKGROUND OF THE INVENTION

1. Field of the Invention

The present invention relates generally to regenerative type furnaces, and more particularly to improvements in regenerative heat exchange structures and the bricks or blocks employed in constructing such structures.

2. Description of the Prior Art

Such heat exchange structures are used with various types of furnaces including those for steel and glass making. The present invention has particular utility in glass melting furnaces and will be described herein in connection with the checkers of such furnaces. However, it will be readily apparent that it may as well be employed with various other types of furnaces.

As is well known, present day flat glass is conventionally produced in a continuous tank-type melting furnace, wherein raw batch materials and scrap glass, or cullet, are continuously delivered to the charging end of the furnace, melted and refined as they move through the furnace, and then withdrawn from its delivery or working end as a continuous ribbon. In furnaces of this type, heat for melting the raw batch material is provided by flames directed through a series of ports arranged along each opposed longitudinal side of the furnace above the mass of glass, the ports leading to sources of supply of fuel and preheated combustion air. The combustion air is preheated by contact with refractory bricks heated by hot waste gases which have previously been withdrawn through checkerwork structures of a regenerator opposite the ports being fired. The direction of firing is periodically reversed, that is, the two series of ports are alternately operated so that first one series of ports is fired with the opposite series of ports serving to exhaust the hot waste gases. Then at periodic intervals, perhaps on the order of 20 to 30 minutes, the operating condition of the two series of ports is reversed, that is, the ports previously being fired serve as the exhaust ports and the ports exhausting the hot waste gases serve as the firing ports. Conventionally, the incoming combustion air and the hot exhaust gases are passed through checkerwork structures and associated tunnels extending the length of and lying beneath the checkerwork structures of the regenerators.

It is common practice to construct checkerwork structures of standard dimension, rectangularly shaped refractory bricks laid up in various arrangements commonly known in the art by the terms "basket weave," "open basket weave," "open-flue" and various other configurations. In addition to the above-mentioned heat exchange structures formed of standard dimension, rectangularly shaped refractory bricks, various types of specially shaped refractory bricks have been suggested for exclusive use in heat exchange systems. Examples of such bricks are disclosed in U.S. Pat. Nos. 4,436,144; 4,519,442 and 4,590,039. Generally, these specially shaped bricks which have been designed in an effort to achieve higher thermal efficiency for specific types of heat exchangers in given applications, have the disadvantage of being somewhat mechanically unstable when laid up in the checkers. Thus, as the checkers are repeatedly subjected to temperature changes over a period of time, the structure may fail.

SUMMARY OF THE INVENTION

Generally stated, the present invention contemplates tubular refractory bricks having their end surfaces formed in such a manner that the bricks can be set in parallel rows, and layers of rows can be stacked one upon another in interlocking arrangement for producing a mechanically stable checker structure having a high thermal efficiency. More particularly, the specially configured refractory member comprises a prismatic tubular brick having mirror image end surfaces, with a central passage extending longitudinally therethrough. Each tubular refractory brick includes two pairs of opposed side walls, adjacent longitudinal edges of the side walls being interconnected in substantially square relation in cross section by angularly disposed corner portions. The central areas of the top and bottom, or end, surfaces of each side wall are provided with longitudinally aligned concave recesses. For stacking the bricks in setting the checkers, the top and bottom surfaces of the corner portions are adapted to engage the corner portions of adjacent vertically aligned bricks, or to be received in the aforementioned recesses of offset or staggered bricks for interlocking the bricks one to another.

OBJECTS AND ADVANTAGES

An object of the invention is to provide a refractory brick of novel configuration for assembly of a mechanically stable checkerwork structure.

Another object of the invention is to provide a specially shaped refractory brick which is adapted to interlock with similarly shaped refractory bricks for producing checkerwork structures of high thermal efficiency.

Other objects and advantages of the invention will become more apparent during the course of the following description, when taken in connection with the accompanying drawings.

BRIEF DESCRIPTION OF THE DRAWINGS

In the drawings, wherein like numerals are employed to designate like parts throughout the same:

FIG. 1 is a diagrammatic end elevational view, partly in section, of a tank-type glass melting furnace embodying the invention;

FIG. 2 is an enlarged perspective view illustrating the preferred embodiment of the tubular refractory brick employed in the regenerators of FIG. 1;

FIG. 3 is a plan view of an alternate embodiment of the tubular refractory brick having arcuate corner segments defining the central passage extending through the brick;

DESCRIPTION OF THE PREFERRED EMBODIMENT

Figure 4:
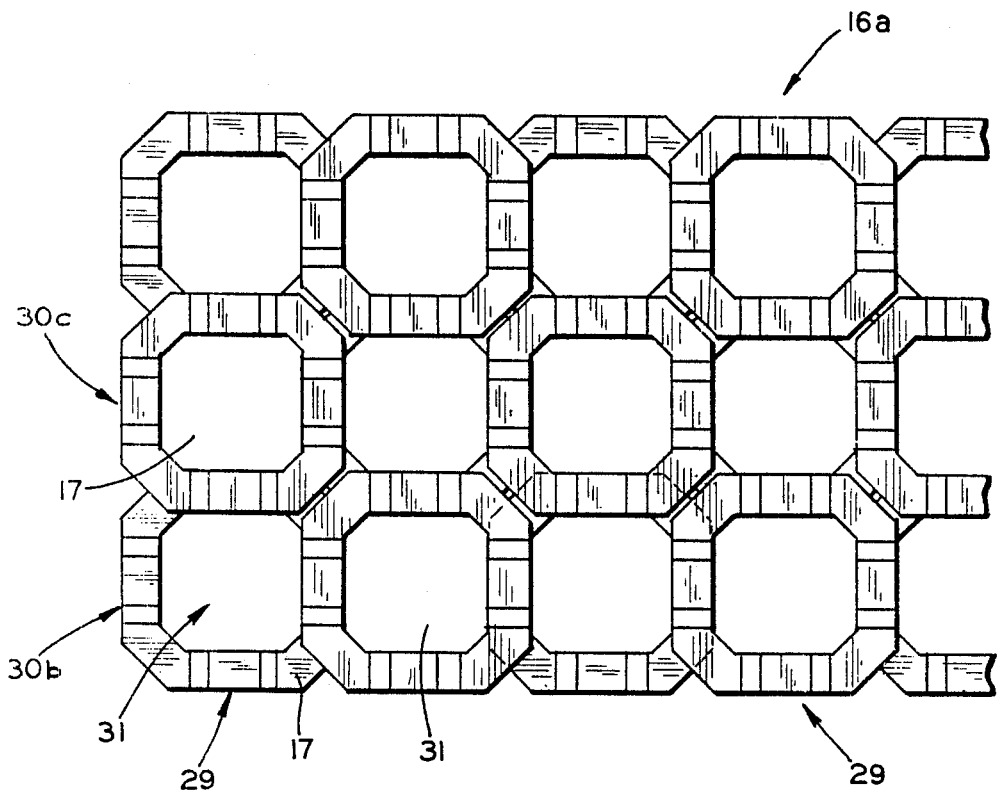
FIG. 4 is an enlarged plan view, taken substantially along line 4—4 of FIG. 1, illustrating at least two courses of a checkerwork structure constructed of the refractory brick illustrated in FIG. 2.

It will be understood that while the checkerwork structure and bricks employed therein have been described herein in the environment of a continuous glass melting furnace, they may also advantageously be employed in other furnaces. Thus, with reference to the drawings, and more particularly to FIG. 1, there is illustrated a portion of a continuous tank-type regenerative glass melting furnace, designated in its entirety by the reference numeral 10, embodying the present invention.

Generally, the glass melting furnace 10 comprises a covered, longitudinally extending tank 11 and a pair of regenerators 12 and 12a, one extending along each side of the tank 11. The tank 11 conventionally includes opposed side walls 13 and 13a and a charging or doghouse area (not shown) at one end. As is well known raw glass making materials, i.e. batch and cullet or scrap glass, are introduced into the charging area by feeder devices (not shown) and reduced to a molten mass 14 within a melting zone, from which they flow into and through refining and cooling zones, and are thereafter removed from the opposite or exit end of the tank 11 in accordance with any of the well known glass forming techniques.

Heat for reducing the batch to molten glass within the melting zone is provided by suitable means such as burners (not shown) which discharge hot flames and products of combustion through two series of ports 15 and 15a opening into the melting tank 11 above the level of the molten glass 14 flowing therethrough. As is common with furnaces of this type, the individual ports (only one shown) of each series 15 and 15a are arranged at spaced intervals along the sides 13 and 13a, respectively, with the number of ports employed being predicated upon a predetermined maximum melting capacity set for the furnace 10.

Referring now in particular to FIGS. 1, 2 and 3, each regenerator 12 and 12a includes a checkerwork structure 16 constructed of a plurality of novel refractory bricks 17 or 17a formed in accordance with the invention. Each checkerwork structure 16 is contained within a unitary refractory brick housing 18. In order to provide for the flow of combustion air upwardly and hot waste gases downwardly through the regenerators 13 and 13a, each regenerator is provided with a lower plenum chamber 19 comprising a longitudinally extending tunnel or passageway, and an upper longitudinally extending plenum chamber 20. To this end, each checkerwork structure 16 is supported on a plurality of transversely extending and longitudinally spaced ceiling supports or arches 21 which support the checkerwork structure 16 above a floor 22. The bricks 17 of the checkerwork structure 16 are topped off below the level of the series of ports 15 and 15a.

According to this invention, and as illustrated in FIGS. 2 and 3, each refractory brick 17 and 17a is a tubular member generally octagonal in cross section, having similar top and bottom surfaces 23 and 24, respectively, with a longitudinal central passage 25 extending therebetween. More specifically, each refractory brick 17 and 17a comprises an octagonally shaped body including two pairs of diametrically opposed side walls 26 and 26a, respectively, disposed at right angles to each other and of uniform wall thickness. Angled or oblique corner portions 27 extend between and join the adjacent longitudinal edges of the side walls to one another. It should be noted that the two pairs of walls 26 and 26a are disposed in a substantially square relation in cross section. Preferably, the corner portions 27 are disposed at an angle of 45 degrees with respect to the adjacent walls 26 and 26a. Also, the width of each of the parallel side walls 26 and 26a is about two and one half times greater than the width of the angled corner portions 27.

As illustrated in FIG. 2, the walls 26 and 26a and the corner portions 27 of that embodiment are of substantially uniform thickness, with the inner surfaces thereof defining an octagonally shaped longitudinal central passage 25. On the other hand, the central passage of the embodiment illustrated in FIG. 3 is tetragonal in cross section, that is, the four inner surfaces of the walls 26 are connected by arcuate portions 28 to define the central passage 25.

The top and bottom surfaces 23 and 24, defined by the opposed ends of the walls 26, 26a and the corner portions 27, are disposed perpendicularly with respect to the central passage 25. As illustrated in FIG. 2, the top and bottom surfaces 23 and 24 of the walls 26 and 26a each include a concave portion or recess 23a and 24a, respectively. The recesses 23a and 24a are disposed in longitudinal alignment with one another and define aligned elevated corner portions 23b and 24b on top and bottom surfaces 23 and 24, respectively. As will be hereinafter described, in stacking the bricks to assemble the checkers. The elevated portions 23b and 24b are adapted to cooperate with corresponding recessed and-/or elevated portions of the bricks 17 in adjacent courses. It should be noted that the recessed portions 23a and 24a, as well as the elevated corner portions 23b and 24b are substantially uniform in size and shape, and are of such configuration that the recessed portions are adapted to receive the elevated portions in an interlocking relationship with the bricks set in a staggered arrangement as well be hereinafter described. To that end each of the recesses 23a and 24a comprises a pair of sloping planar end walls 23c or 24c, interconnected by a planar base 23d or 24d, respectively. The bricks may also be laid up with adjacent courses vertically aligned or horizontally offset with the corner portions 23b and 24b stacked one upon another. Thus, it will be apparent the aforedescribed exterior configuration of the brick 17 permits a number of bricks to be arranged in various patterns of stacked courses of checkerwork structures heretofore not possible by known prior art bricks.

Figure 5:
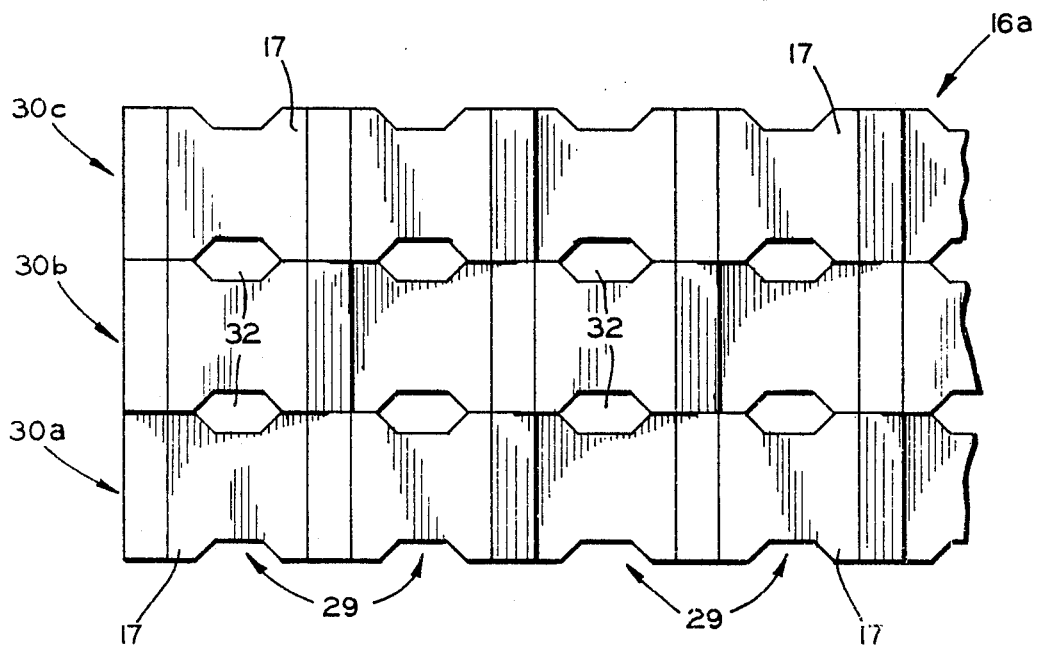
FIG. 5 is an enlarged, fragmentary elevational view of the checkerwork structure illustrated in FIG. 4.

One pattern 16a of checkerwork structure, known as a closed setting, is illustrated in FIGS. 4 and 5 and includes a number of parallely arranged horizontal rows 29 of bricks 17, with the bricks in alternate rows being offset one from another (see FIG. 4). Also, the checkerwork structure includes a number of vertically disposed courses or layers 30a, 30b and 30c of rows 29 (see FIG. 5), with the rows 29 of bricks 17 of one layer being staggered relative to the bricks 17 in an adjacent layer. In this pattern, vertically extending passages 31 (FIG. 4) are formed in the checkerwork, the passages 31 being defined, in alternate layers or courses, by the central passage 25 in the tubular bricks 17 of one layer, and the exterior surfaces of the walls 26 and/or 26a of four adjoining bricks 17 in the adjacent layer of the parallel rows 29 of bricks 17.

Also in this pattern of checkerwork structure 16a, cross passages 32 through the bricks are defined by cooperating depressed portions 23a and 24a of bricks 17 in adjacent layers, permitting gas flow between the vertical passages 31. This cross-flow of gases creates a turbulence and equalizes pressure in the flow of both the combustion air and hot waste gases, resulting in increased heat exchange between the bricks and the gases. In order to achieve still greater cross flow of the combustion air and exhaust gases, the novel bricks of the invention may be set in a so-called open setting (not shown) wherein the bricks 17 are omitted in alternate parallel rows 29 in either or both directions. There will thus be created transversely extending passageways having a cross-sectional area comparable to the dimensions of the omitted bricks.

Figure 6:
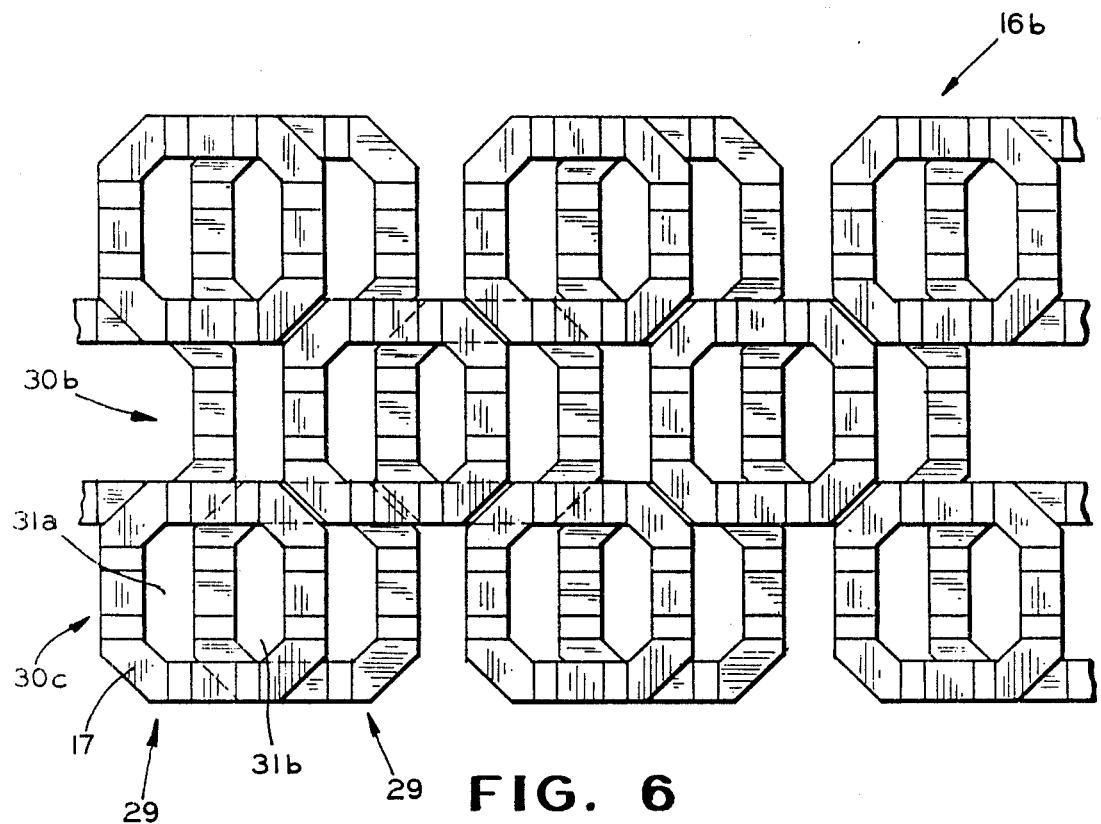
FIG. 6 is an enlarged plan view similar to FIG. 4, illustrating at least two courses of an offset interlocking checkerwork structure constructed with the refractory brick illustrated in FIG. 2.
Figure 7:
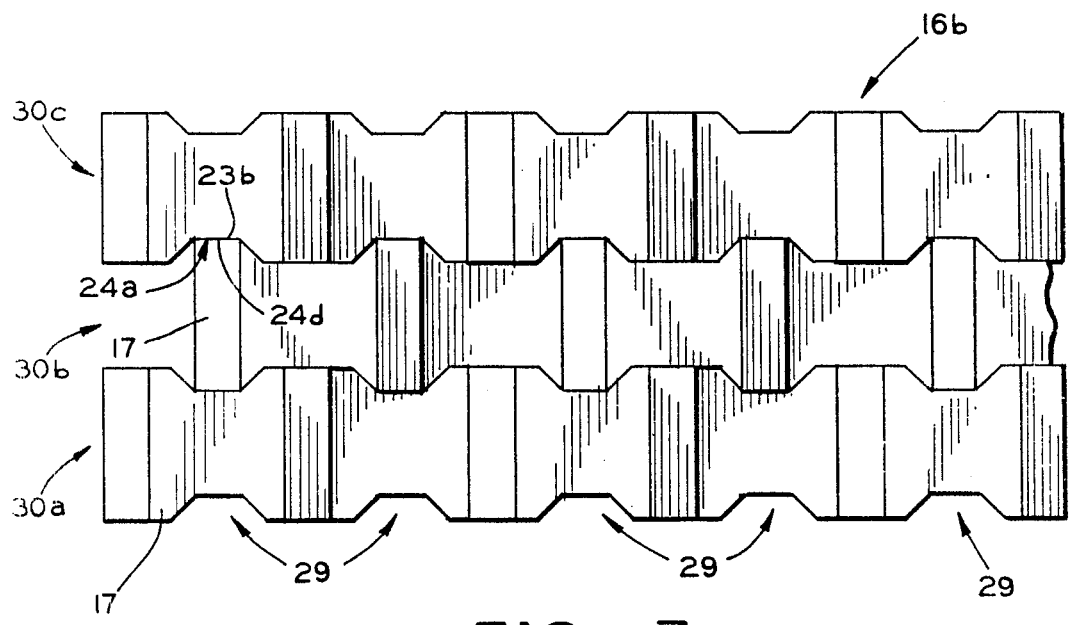
FIG. 7 is an enlarged elevational view of the checkerwork structure illustrated in FIG. 6.

Another pattern 16b of checkerwork structure is shown in FIGS. 6 and 7. In accordance with this pattern, the adjacent layers 30a, 30b and 30c are interlocked to each other by staggering one layer or course of bricks relative to the next so that the top, elevated portion 23b of one layer of bricks 17 is received in and cooperates with the bottom, recessed portions 24a of the adjacent layer of bricks (see FIG. 7). More particularly, the elevated portions 23b and 24b and associated sloping walls 23c and 24c engage and rest upon the bases 23d or 24d and their associated sloping walls. In this pattern, gas flow turbulence is enhanced and refractory contact area is increased by separation of the vertical passages 31 into two parts 31a and 31b due to the staggered setting of alternate courses of bricks.

It will, of course, be understood that while the aforedescribed settings of the novel brick have been individually described and illustrated as utilized in a particular checker structure, the closed, open and interlocked setting arrangements may be combined in various combinations as desired for specific installations.

It is to be understood that the forms of the invention herewith shown and described are to be taken as illustrative embodiments only of the same, and that various changes in the shape, size and arrangement of the parts may be resorted to without departing from the spirit of the invention.

What is claimed is:

1. A refractory brick for assembling furnace checkers, comprising a tubular body having a central passage extending longitudinally therethrough, opposite end surfaces adapted for stacking one brick upon another, and corresponding longitudinally aligned recesses in said opposite end surfaces extending between the interior and exterior of said tubular body, said tubular body being generally octagonal in cross section including two pairs of diametrically opposed side walls disposed at right angles to each other, oblique corner portions joining the adjacent longitudinal edges of said side walls, and a said recess in each end of each said side wall, said recesses defining therebetween raised corner portions having configurations complementary and adapted for interlocking reception in a portion of said recesses.

2. A refractory brick for assembling furnace checkers as claimed in claim 1, wherein each said recess comprises a pair of sloping planar end walls interconnected by a planar base.

3. A refractory brick for assembling furnace checkers as claimed in claim 1, including a recess in each end of each said side wall, each said recess comprising a pair of sloping planar end walls interconnected by a planar base.

4. A refractory brick for assembling furnace checkers as claimed in claim 3, wherein said pairs of side walls are disposed in substantially square relation to one another in cross section and said corner portions are disposed at about 45° to said side walls, the width of said side walls being about two and one half times the width of said oblique corner portions at the exterior periphery of said brick.

5. A refractory brick for assembling furnace checkers as claimed in claim 4, wherein said recesses are centrally located along the longitudinal axes of said side walls so as to define aligned elevated corner portions on said end surfaces separated by said recesses.

6. A refractory brick for assembling furnace checkers as claimed in claim 5, the configuration of said centrally located recesses and said elevated corner portions being complementary whereby adjacent recesses cooperate to define cross passages with said bricks stacked with at least one of their side walls in vertically aligned relationship, and the elevated corner portions are received in said recesses in interlocking relationship with bricks stacked and offset one half brick width in adjacent layers.

7. A refractory brick for assembling furnace checkers as claimed in claim 1, wherein the interior and exterior surfaces of said side walls and corner portions are planar.

8. A refractory brick for assembling furnace checkers as claimed in claim 1, wherein the exterior and interior surfaces of said side walls and the exterior surface of said corner portions are planar and the interior surface of said corner portions is curvilinear in transverse section.

9. A refractory brick for assembling furnace checkers as claimed in claim 7, wherein said interior surface of said corner portions includes a cylindrical segment.

10. in a heat exchange structure of the type having a number of vertically disposed layers of parallel rows of refractory bricks defining a number of vertical passages extending from top to bottom of the structure, each refractory brick comprising:
   a. A tubular member having mirror image top and bottom surfaces with a central passage extending therebetween;
   b. Said tubular member including at least two pairs of parallel side walls including top and bottom surfaces having aligned recesses formed therein, said side walls being disposed in a substantially square relation in cross-section;
   c. Angle portions extending between and connecting the adjacent corner edges of said side walls, the top and bottom surfaces of said corner edges being elevated with respect to the recesses; and
   d. The recesses in said top and bottom surfaces of said two pairs of parallel sidewalls and said elevated top and bottom surfaces of said angled corner portions being substantially the same in size and shape whereby said tubular bricks can be stacked in offset relation one to another.

11. The invention defined in claim 10, wherein said side walls are of substantially uniform thickness and said angle portions are disposed at 45° angles relative to said side walls.

12. The invention defined in claim 10, wherein the width of each side wall of said two pairs of parallel walls is about two and one half times the width of said angle corner portions.

13. A checker-work structure for regenerative-type furnaces comprising stacked layers of vertically oriented tubular refractory bricks, said refractory bricks being generally octagonal in cross section with opposite end surfaces perpendicular to their longitudinal axis, and said end surfaces of each said brick including corresponding longitudinally aligned recesses extending between the interior and exterior of said brick, wherein said bricks include two pairs of diametrically opposed side walls disposed perpendicular to one another, oblique corner portions joining the adjacent longitudinal edges of said side walls and a said recess in each end of each said side wall, said recesses defining therebetween raised corner portions having configurations complementary and adapted for interlocking reception in a portion of said recesses.

14. A checkerwork structure for regenerative-type furnaces as claimed in claim 13, said bricks being stacked with at least some of said side walls in adjacent ones of said layers of said bricks in vertical alignment whereby said recesses in abutting and surfaces cooperate to define cross passages in said checkerwork structure.

15. A checkerwork structure for regenerative-type furnaces as claimed in claim 14, wherein the bricks in each said layer are assembled with said oblique corner portions in abutting, face-to-face relationship, the bricks in alternate ones of said stacked layers being offset to span the space between said bricks of an adjacent layer whereby the interior of bricks in one layer and the exterior surfaces of said side walls of bricks in adjacent layers define vertical passages within said checkerwork structure.

16. a checkerwork structure for regenerative-type furnaces as claimed in claim 15, wherein at least some of said layers comprise bricks only in alternate parallel rows in at least one direction whereby the bricks in said alternate parallel rows define therebetween transversely extending passageways within said structure.

17. A checkerwork structure for regenerative-type furnaces as claimed in claim 13, wherein said recesses comprise a pair of sloping planar end walls interconnected by a planar base, the bricks in alternate ones of said stacked layers being staggered in one direction relative to the bricks of the adjacent layer, with said raised corner portions of pairs of adjacent bricks being received in said recesses whereby adjacent layers of bricks are interlocked to each other.

* * * * *